US009018346B2

(12) United States Patent
Joo et al.

(10) Patent No.: US 9,018,346 B2
(45) Date of Patent: Apr. 28, 2015

(54) METHOD FOR REMOVING UNREACTED MONOMERS IN POLYMER USING SCC

(75) Inventors: Eun-Jung Joo, Daejeon (KR);
Dong-Kwon Lee, Daejeon (KR);
Dae-Young Shin, Daejeon (KR);
Jong-Ku Lee, Daejeon (KR);
Chang-Hoe Heo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/116,585

(22) PCT Filed: May 25, 2012

(86) PCT No.: PCT/KR2012/004178
§ 371 (c)(1),
(2), (4) Date: Nov. 8, 2013

(87) PCT Pub. No.: WO2012/165817
PCT Pub. Date: Dec. 6, 2012

(65) Prior Publication Data
US 2014/0066580 A1  Mar. 6, 2014

(30) Foreign Application Priority Data

May 27, 2011 (KR) .................. 10-2011-0050642
May 25, 2012 (KR) .................. 10-2012-0056074

(51) Int. Cl.
*C08G 75/02* (2006.01)
*B01D 21/26* (2006.01)
*B01J 19/00* (2006.01)
*B01J 19/18* (2006.01)
*C08F 114/06* (2006.01)
*C08C 2/06* (2006.01)

(52) U.S. Cl.
CPC .............. *B01D 21/265* (2013.01); *B01J 19/006* (2013.01); *B01J 19/18* (2013.01); *C08F 114/06* (2013.01); *B01J 2219/00774* (2013.01); *B01J 2219/00777* (2013.01); *B01J 2219/00779* (2013.01); *B01J 2219/185* (2013.01); *B01J 2219/1943* (2013.01)

(58) Field of Classification Search
USPC ............. 525/393, 402; 526/71, 279; 422/131, 422/138
See application file for complete search history.

(56) References Cited

U.S. PATENT DOCUMENTS 4,007,022 A     2/1977  Schleicher et al.
2014/0088273 A1* 3/2014  Joo et al. ................. 526/71

FOREIGN PATENT DOCUMENTS

| CN | 1978606 A     | 6/2007  |
|----|---------------|---------|
| DE | 1083784       | 4/1959  |
| DE | 65236 A       | 1/1969  |
| EP | 0191625 A2    | 8/1986  |
| FR | 1302176 A     | 8/1962  |
| GB | 898796 A      | 6/1962  |
| JP | 51-050991 A   | 5/1976  |
| JP | 52-121688 A   | 10/1977 |
| JP | 53-051176 A   | 5/1978  |
| JP | 61-274705 A   | 12/1986 |
| JP | 2001-172667 A | 6/2001  |
| JP | 2005-105047 A | 4/2005  |
| JP | 2005313100 A  | 11/2005 |
| JP | 2014-515417 A | 6/2014  |

OTHER PUBLICATIONS

Riley, P.C., et al. "Industrial Applications of Spinning Cone Column." FT Industrial Pty Ltd; Reading UK; Flavourtech Research; Griffith, Australia. pp. 1-15.

* cited by examiner

*Primary Examiner* — Terressa Boykin
(74) *Attorney, Agent, or Firm* — McKenna Long & Aldridge LLP

(57) ABSTRACT

The present invention provides a method for removing unreacted monomer in polymer using a SCC comprising a housing having a rotation axis; a supply part of at least one polymer formed inside of the housing; at least two spinning cones that are installed so as to have a constant gradient from the upper part to the lower part to the rotation axis, move polymer supplied through the polymer supply part, and rotate around the rotation axis; a fixed cone that is fixed and formed on the inner side of the housing, and provides a pathway for sequentially moving polymer from a spinning cone at the upper part to a spinning cone at the lower part; a product collection part for collecting polymer moved through the spinning cone and the fixed cone; and a driving part for rotating the spinning cone. The method for removing unreacted monomers in polymer using SCC according to the present invention may control polymer residence time and thus does not lower polymer stability even under high temperature condition, and has high area density and thus has excellent unreacted monomer removal efficiency without using steam and the like, or with a small amount of steam, and the like.

11 Claims, 1 Drawing Sheet

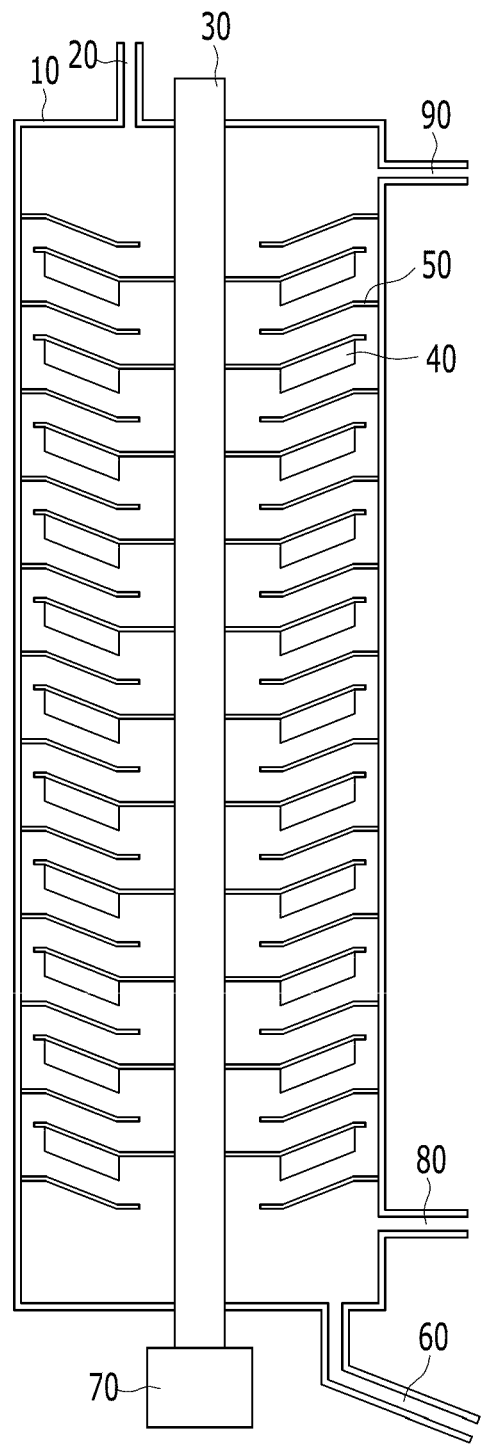

METHOD FOR REMOVING UNREACTED MONOMERS IN POLYMER USING SCC

This application is a 35 USC §371 National Stage entry of International Application No. PCT/KR2012/004178, filed on May 25, 2012, which claims priority of Korean Application No. 10-2011-0050642, filed on May 27, 2011, and Korean Application No. 10-2012-0056074, filed on May 25, 2012, all of which are hereby incorporated by reference in their entirety.

BACKGROUND OF THE INVENTION (a) Field of the Invention

The present invention relates to a method for removing unreacted monomers in polymer using a SCC.

(b) Description of the Related Art

In general, to obtain a product through a chemical reaction, a reaction device is required. As the reaction device, a batch reactor where raw product is added to one reactor, and then, a reaction is conducted through agitation, and the like has been generally used. However, according to this method, sufficient reactions are not achieved for a reaction requiring rapid material transfer speed, thus generating a large amount of non-raw product, and if a catalyst is used, a catalyst separation process is required thus increasing a cost as a reactor has large-capacity.

Therefore, Korean Registered Patent No. 961,765 has suggested a spinning disc reactor, but it has a problem in that disc residence time of crude product is short because spinning discs are horizontally arranged, and thus, a spinning cone column (SCC) with improved residence time of crude product by multistage installation of inclined discs, namely cones has been preferred.

Meanwhile, to remove unreacted monomers in polymer, a column equipped with a tray has been conventionally used. For example, Korean Laid-Open Patent Publication No. 2000-0062362 discloses a method and a device for removing remaining monomers using a tray column. As such, in the prior art, since unreacted monomers in polymer was removed using a column equipped with a tray, polymer residence time was long thus influencing on polymer stability and generating polymer scale on a tray, and excessive amount of steam was required. Therefore, there is a need for a development of a novel device for separating unreacted monomers.

SUMMARY OF THE INVENTION

It is an object of the present invention to provide a method for removing unreacted monomers in polymer using a SCC instead of using a column equipped with a tray when removing unreacted monomers in polymer.

The present invention provides a method for removing unreacted monomers in polymer using a SCC comprising a housing having a rotation axis; a supply part of at least one polymer formed inside of the housing; at least two spinning cones that are installed so as to have a constant gradient from the upper part to the lower part to the rotation axis, move polymer supplied through the polymer supply part, and rotate around the rotation axis; a fixed cone that is fixed and formed on the inner side of the housing, and provides a pathway for sequentially moving polymer from a spinning cone at the upper part to a spinning cone at the lower part; a product collection part for collecting polymer moved through the spinning cone and the fixed cone; and a driving part for rotating the spinning cone.

Wherein, 2 to 40 spinning cones may be arranged from the upper part to the lower part around the rotation axis.

And, the spinning cones may rotate around the same rotation axis at a rotation speed where G according to the following Equation 1 becomes 1 to 100 times.

$$G = \frac{r\left(\frac{2\pi \times RPM}{60}\right)^2}{9.8} \quad \text{[Equation 1]}$$

wherein, G is a multiple of gravitational acceleration, r is radius(m) of the cone, and RPM is a rotation speed (times/min).

And, the spinning cone may be equipped with a heater and a temperature control means inside.

And, the SCC may be equipped with a heater and a temperature control means for progressing a reaction on the outer wall or inner wall of the housing, and the driving part may be a motor.

Furthermore, the SCC may further comprise a gas supply part and a remaining gas discharge part.

And, air or steam may be introduced into the gas supply part.

And, the polymer may be PVC, and the unreacted monomer may be VCM (vinyl chloride monomer).

Furthermore, supply temperature of the PVC may be 40 to 75° C., operation temperature of the SCC may be 50 to 70° C., operation pressure of the SCC may be 0.3 to 1 atm abs., supply flow velocity of the PVC may be 15 to 10,000 liter/hr, and the initial monomer content of the PVC may be 0.1 to 2%.

According to another aspect of the invention, there is provided a SCC for removing unreacted monomer in polymer comprising: a housing having a rotation axis; a supply part of at least one polymer formed inside of the housing; at least two spinning cones that are installed so as to have a constant gradient from the upper part to the lower part to the rotation axis, move polymer supplied through the polymer supply part, and rotate around the rotation axis; a fixed cone that is fixed and formed on the inner side of the housing, and provides a pathway for sequentially moving polymer from a spinning cone at the upper part to a spinning cone at the lower part; a product collection part for collecting polymer moved through the spinning cone and the fixed cone; and a driving part for rotating the spinning cone.

Wherein, the SCC may further comprise a gas supply part and a remaining gas discharge part.

The method for removing unreacted monomers in polymer using SCC according to the present invention solves the problems that if a process of removing unreacted monomers from polymer is conducted using a common column, polymer residence time is long thus influencing on polymer stability and generating polymer scale on a tray, and it may control polymer residence time and thus does not lower polymer stability even under high temperature condition, and has high area density and thus has excellent unreacted monomer removal efficiency without using steam, and the like, or with a small amount of steam, and the like.

DETAILED DESCRIPTION OF THE EMBODIMENTS

The present invention may have many examples and various modifications may be made, and specific examples will be illustrated in drawings and explained in detail. However, it should be understood that the present invention is not limited to specific examples, and includes all modifications, equivalents or substitutions within the idea and technical scope of the invention. In the explanations of the invention, detailed explanations of related known technologies may be omitted if it is judged to obscure the subject matter of the invention.

The present invention provides a method for removing unreacted monomers in polymer using a SCC comprising: a housing (10) having a rotation axis (30); a supply part (20) of at least one polymer formed inside of the housing; at least two spinning cones (40) that are installed so as to have a constant gradient to the rotation axis from the upper part to the lower part, move polymers supplied through the polymer supply part, and rotate around the rotation axis (30); a fixed cone (50) that is fixed and formed on the inner side of the housing, and provides a pathway for sequentially moving polymer from a spinning cone at the upper part to a spinning cone at the lower part; a product collection part (60) for collecting polymers moved through the spinning cone and the fixed cone; and a driving part (70) for rotating the spinning cone.

The method for removing unreacted monomers in polymer using SCC according to the present invention may control polymer residence time and thus does not lower polymer stability even under high temperature condition, and has high area density and thus does not use steam, and the like or has excellent unreacted monomer removal efficiency with small amount of steam, and the like.

According to one embodiment of the invention, at least two spinning cones may be installed so as to have a constant gradient from the upper part to the lower part along the same rotation axis. When the rotation axis rotates, the spinning cones simultaneously rotate to spread supplied polymer on the spinning cone thereby broadening the surface area to facilitate the removal of material to be removed by contact with gas, and the like. Wherein, at least two, preferably 2 to 40, more preferably 2 to 23 spinning cones may be arranged from the upper part to the lower part around the rotation axis.

And, the fixed cone may provide a pathway for sequentially moving polymers from a spinning cone at the upper part to another spinning cone at the lower part. The fixed cone is fixed and formed on the inner side of the housing, and thus, it does not rotate when the rotation axis rotates.

According to the present invention, polymer is supplied to the polymer supply part formed in side of the housing, and moves to the lower part through the spinning cone and the fixed cone by the rotation of the rotation axis. During the movement, material to be removed is removed, and polymer free of material to be removed moves to the product collection part.

And, the spinning cones may rotate around the same rotation axis at a rotation speed where G according to the following Equation 1 may become 1 to 100 times.

$$G = \frac{r\left(\frac{2\pi \times RPM}{60}\right)^2}{9.8} \quad \text{[Equation 1]}$$

Wherein, G is a multiple of gravitational acceleration, r is radius(m) of the cone, and RPM is a rotation speed (times/min).

And, the spinning cone may be equipped with a heater and a temperature control means inside, the SCC may be equipped with a heater and a temperature control means for progressing reactions on the outer wall or inner wall of the housing, and the driving part may be a motor.

And, in case a gas-liquid reaction is progressed, the SCC may further comprise a gas supply part (80) and a remaining gas discharge part (90). Namely, a gas supply part capable of supplying gas to the inside of the housing may be selectively installed on the outer wall of the housing. In this case, it is preferable to install an inlet immediately under the raised spot of the housing inner wall and introduce gas. And, the remaining gas produced after reaction may be discharged through a remaining gas discharge part separately installed at the upper part of the housing.

Furthermore, the housing may be made of stainless steel, but is not limited thereto.

And, according to one embodiment of the invention, there is no need to use excessive amount of air or steam, and the like, which is used when using a common column, and if it is used, air or steam may be introduced into the gas supply part. In this case, excellent unreacted monomer removal efficiency may be achieved with a small amount of air or steam.

And, the polymer may be PVC, and the unreacted monomer may be VCM (vinyl chloride monomer).

If polymer including unreacted monomers is supplied through the polymer supply part of the SCC according to the present invention, it passes through the spinning cone and the fixed cone by the rotation of the rotation axis, and VCM (vinyl chloride monomer) in PVC is discharged to the discharge part by introduced steam.

Wherein, PVC supply temperature may be 40 to 75° C., SCC operation temperature may be 50 to 70° C., SCC operation pressure may be 0.3 to 1 atm abs., PVC supply flow velocity may be 15 to 10,000 liter/hr, and the initial monomer content of PVC may be 0.1 to 2%.

If PVC supply temperature and SCC operation temperature do not fall within the above ranges, product quality may be lowered and a lot of scales may be generated, and in SCC operation pressure less than 0.3 atm abs., a lot of foam may be generated thus rendering operation difficult. And, PVC supply flow velocity to a device for laboratory or a commercialized device may be preferably 15 to 10,000 liter/hr according to the size of SCC.

Hereinafter, preferable examples of the present invention will be explained in detail. However, these examples are only to illustrate the invention, and the scope of the invention is not limited thereto.

Example 1

PVC having the initial VCM concentration of 12,000 ppm was introduced into a SCC, and the SCC was operated at operation temperature of 55~60° C., and operation pressure of 0.55 KG abs. Wherein, residence time was 1 minute, and remaining VCM concentration after treatment was 820 ppm.

Example 2

PVC having the initial VCM concentration of 12,000 ppm was introduced into a SCC, and the SCC was operated at operation temperature of 55~60° C., and operation pressure of 0.4 KG abs. Wherein, residence time was 1 minute, and remaining VCM concentration after treatment was 450 ppm.

Example 3

PVC having the initial VCM concentration of 12,000 ppm was introduced into a SCC, air was introduced inside of the SCC, and the SCC was operated at operation temperature of 55~60° C., and operation pressure of 0.55 KG abs. Wherein, residence time was 1 minute, and remaining VCM concentration after treatment was 150 ppm.

Example 4

PVC having the initial VCM concentration of 12,000 ppm was introduced into a SCC, steam was introduced inside of the SCC, and the SCC was operated at operation temperature of 55~60° C., and operation pressure of 0.4 KG abs. Wherein, residence time was 1 minute, and remaining VCM concentration after treatment was 90 ppm.

Comparative Example 1

PVC having the initial VCM concentration of 12,000 ppm was introduced into a common evaporation column, and the column was operated at operation temperature of 55° C., operation pressure of 0.55 KG abs. for a residence time of 20 minutes. The remaining VCM concentration after treatment was 3000 ppm.

Comparative Example 2

PVC having the initial VCM concentration of 12,000 ppm was introduced into a batch tank, and it was operated at operation temperature of 55~60° C., operation pressure of 0.15 KG abs. for a residence time of 20 minutes. During the operation, a lot of foam was generated, and the remaining VCM concentration after treatment was 1400 ppm.

From the above, it can be seen that Examples 1 to 4 wherein VCM was removed using a SCC have excellent VCM removal efficiency compared to Comparative Examples 1 to 2 using a batch tank or a common evaporation column.

Thus, it can be seen that the method for removing unreacted monomers in polymer using a SCC according to the present invention does not lower polymer stability even under high temperature condition because it may control polymer residence time by using a SCC, has high unreacted monomer removal efficiency without using steam, and the like due to high area density, and if steam and the like is used, has excellent unreacted monomer removal efficiency with a small amount.

Although specific embodiments of the present invention have been described in detail, it would be obvious to one of ordinary knowledge in the art that these are no more than preferable examples, and the scope of the invention is not limited thereto. Thus, the scope of the invention is substantially defined by appended claims and equivalents thereof.

What is claimed is:

1. A method for removing unreacted monomers in polymer using a SCC (spinning cone column) comprising
    a housing having a rotation axis;
    a supply part of at least one polymer formed inside of the housing;
    at least two spinning cones that are installed so as to have a constant gradient from the upper part to the lower part to the rotation axis, move polymer supplied through the polymer supply part, and rotate around the rotation axis;
    a fixed cone that is fixed and formed on the inner side of the housing, and provides a pathway for sequentially moving polymer from a spinning cone at the upper part to a spinning cone at the lower part;
    a product collection part for collecting polymer moved through the spinning cone and the fixed cone; and
    a driving part for rotating the spinning cone.

2. The method for removing unreacted monomers in polymer using a SCC according to claim 1, wherein 2 to 40 spinning cones are arranged from the upper part to the lower part around the rotation axis.

3. The method for removing unreacted monomers in polymer using a SCC according to claim 1, wherein the spinning cones rotate around the same rotation axis at a rotation speed where G according to the following Equation 1 becomes 1 to 100 times $$G = \frac{r\left(\frac{2\pi \times RPM}{60}\right)^2}{9.8} \quad \text{[Equation 1]}$$

wherein, G is a multiple of gravitational acceleration, r is radius(m) of the cone, and RPM is a rotation speed (times/min).

4. The method for removing unreacted monomers in polymer using a SCC according to claim 1, wherein the spinning cone is equipped with a heater and a temperature control means inside.

5. The method for removing unreacted monomers in polymer using a SCC according to claim 1, wherein the SCC is equipped with a heater and a temperature control means for progressing a reaction on the outer wall or inner wall of the housing.

6. The method for removing unreacted monomers in polymer using a SCC according to claim 1, wherein the SCC further comprises a gas supply part and a remaining gas discharge part.

7. The method for removing unreacted monomers in polymer using a SCC according to claim 6, wherein air or steam is introduced into the gas supply part.

8. The method for removing unreacted monomers in polymer using a SCC according to claim 1, wherein the polymer is PVC, and the unreacted monomer is VCM (vinyl chloride monomer).

9. The method for removing unreacted monomers in polymer using a SCC according to claim 8, wherein supply temperature of the PVC is 40 to 75° C., operation temperature of the SCC is 50 to 70° C., operation pressure of the SCC is 0.3 to 1 atm abs., supply flow velocity of the PVC is 15 to 10,000 liter/hr, and the initial monomer content of the PVC is 0.1 to 2%.

10. A SCC for removing unreacted monomer in polymer comprising:
    a housing having a rotation axis;
    a supply part of at least one polymer formed inside of the housing;
    at least two spinning cones that are installed so as to have a constant gradient from the upper part to the lower part to the rotation axis, move polymer supplied through the polymer supply part, and rotate around the rotation axis;
    a fixed cone that is fixed and formed on the inner side of the housing, and provides a pathway for sequentially moving polymer from a spinning cone at the upper part to a spinning cone at the lower part;
    a product collection part for collecting polymer moved through the spinning cone and the fixed cone; and
    a driving part for rotating the spinning cone.

11. The SCC for removing unreacted monomers in polymer according to claim 10, wherein the SCC further comprises a gas supply part and a remaining gas discharge part.

* * * * *